US011986942B2

(12) United States Patent
Davis et al.

(10) Patent No.: US 11,986,942 B2
(45) Date of Patent: *May 21, 2024

(54) POWER TOOL WITH COMBINED CHIP FOR WIRELESS COMMUNICATIONS AND POWER TOOL CONTROL

(71) Applicant: MILWAUKEE ELECTRIC TOOL CORPORATION, Brookfield, WI (US)

(72) Inventors: Anthony Davis, Brookfield, WI (US); Alexander Huber, Menomonee Falls, WI (US); Timothy R. Obermann, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,907

(22) Filed: Feb. 6, 2023

(65) Prior Publication Data

US 2023/0256582 A1 Aug. 17, 2023

Related U.S. Application Data

(63) Continuation of application No. 16/879,245, filed on May 20, 2020, now Pat. No. 11,571,803.

(Continued)

(51) Int. Cl.
 *B25F 5/02* (2006.01)
 *G01D 5/14* (2006.01)
(Continued)

(52) U.S. Cl.
 CPC .............. *B25F 5/02* (2013.01); *G01D 5/145* (2013.01); *H04M 1/72412* (2021.01);
(Continued)

(58) Field of Classification Search
 CPC .. B25B 21/02; B25F 5/02; H01H 1/22; H01H 13/14; H01H 13/52; H01H 15/005;
(Continued)

(56) References Cited

U.S. PATENT DOCUMENTS 5,838,412 A * 11/1998 Ueda ...................... H05K 1/028
 349/150
6,542,025 B1 * 4/2003 Kutz ......................... G06F 1/08
 327/536

(Continued)

FOREIGN PATENT DOCUMENTS

CN 106960556 A 7/2017
CN 107900987 A 4/2018
(Continued)

OTHER PUBLICATIONS

U.S. Appl. No. 62/691,160 specification (Year: 2018).*
(Continued)

*Primary Examiner* — Dung B Huynh
(74) *Attorney, Agent, or Firm* — Michael Best & Friedrich LLP

(57) ABSTRACT

Power tool devices described herein include a motor, an actuator configured to be actuated by a user, a plurality of power switching elements configured to drive the motor, a gate driver coupled to the plurality of power switching elements and configured to control the plurality of power switching elements, a first printed circuit board (PCB), an antenna, and a combined chip. The combined chip is located on the first PCB and is coupled to the actuator, the antenna, and the gate driver. The combined chip includes a memory and an electronic processor configured to determine that the actuator has been actuated, and provide, in response to determining that the actuator has been actuated, a signal to the gate driver, control the signal based on the motor position information, wirelessly transmit power tool device (Continued)

information to an external device, and wirelessly receive configuration information from the external device via the antenna.

20 Claims, 10 Drawing Sheets

Related U.S. Application Data

(60) Provisional application No. 62/854,656, filed on May 30, 2019.

(51) Int. Cl.
*H04M 1/72412* (2021.01)
*H04M 1/72415* (2021.01)
*B25B 21/02* (2006.01)
*B25D 16/00* (2006.01)

(52) U.S. Cl.
CPC ......... *H04M 1/72415* (2021.01); *B25B 21/02* (2013.01); *B25D 16/00* (2013.01); *B25D 2250/221* (2013.01)

(58) Field of Classification Search
CPC ....... H01H 2009/065; H01H 2013/525; H01H 21/24; H01H 2231/048; H01H 9/54; H01H 9/541; H02P 6/14; H02P 6/16; H05K 1/0206; H05K 1/112; H05K 1/115; H05K 1/181; H05K 2201/066; H05K 2201/10053; H05K 2201/10166; H05K 2201/10174; H05K 2201/10545; H05K 3/284; H05K 7/2039; H04M 1/72412; H04M 1/72415; B25D 16/00; B25D 2250/221
See application file for complete search history.

(56) References Cited

U.S. PATENT DOCUMENTS

| | | | |
|---|---|---|---|
| 6,845,279 B1 | 1/2005 | Gilmore et al. | |
| 6,872,121 B2 | 3/2005 | Wiesner et al. | |
| RE41,160 E | 3/2010 | Gilmore et al. | |
| RE41,185 E | 3/2010 | Gilmore et al. | |
| 8,169,298 B2 | 5/2012 | Wiesner et al. | |
| 8,260,452 B2 | 9/2012 | Austin et al. | |
| 9,205,587 B2* | 12/2015 | de Oliveira Antunes | B29C 45/2703 |
| 9,256,988 B2 | 2/2016 | Wenger et al. | |
| 9,430,928 B2 | 8/2016 | Ikeda et al. | |
| 9,462,645 B1* | 10/2016 | Cai | H05B 45/14 |
| 9,466,198 B2 | 10/2016 | Burch et al. | |
| 9,559,755 B2 | 1/2017 | Breitenbach et al. | |
| 9,756,402 B2 | 9/2017 | Stampfl et al. | |
| 9,787,159 B2 | 10/2017 | Beyerl | |
| 9,799,929 B2 | 10/2017 | Kawase et al. | |
| 9,908,182 B2 | 3/2018 | Phillips et al. | |
| 9,940,813 B2 | 4/2018 | Nishikawa et al. | |
| 10,065,337 B1 | 9/2018 | Steciak, Jr. | |
| 10,351,050 B1* | 7/2019 | Elwell | B60Q 1/2615 |
| 10,520,978 B1* | 12/2019 | Li | G06F 1/1683 |
| 11,428,365 B1 | 8/2022 | Hammonds | |
| 11,432,828 B1 | 9/2022 | Lang | |
| 11,446,810 B1 | 9/2022 | Chua et al. | |
| 11,448,026 B1 | 9/2022 | Al-Mousa et al. | |
| 11,571,803 B2* | 2/2023 | Davis | B25F 5/02 |
| 2003/0071033 A1* | 4/2003 | Riess | B23K 13/01 |
| | | | 219/633 |
| 2004/0217935 A1* | 11/2004 | Jeon | G11C 19/28 |
| | | | 345/100 |
| 2004/0246662 A1* | 12/2004 | Thurk | H02M 7/003 |
| | | | 361/703 |
| 2005/0185353 A1* | 8/2005 | Rasmussen | H02M 5/293 |
| | | | 361/93.9 |
| 2006/0025078 A1 | 2/2006 | Sinha et al. | |
| 2006/0101354 A1* | 5/2006 | Hashimoto | G06F 3/04845 |
| | | | 715/708 |
| 2008/0224323 A1* | 9/2008 | Otremba | H01L 24/37 |
| | | | 257/E23.141 |
| 2008/0252567 A1* | 10/2008 | Kawabe | G09G 5/399 |
| | | | 345/76 |
| 2009/0243986 A1* | 10/2009 | Jung | G09G 3/3406 |
| | | | 345/94 |
| 2009/0273436 A1 | 11/2009 | Gluck et al. | |
| 2010/0308764 A1* | 12/2010 | Suzuki | H02P 6/12 |
| | | | 318/494 |
| 2012/0293103 A1* | 11/2012 | Forster | H01R 12/718 |
| | | | 318/503 |
| 2012/0307676 A1* | 12/2012 | Chan | H04W 24/08 |
| | | | 370/252 |
| 2013/0109375 A1 | 5/2013 | Zeiler et al. | |
| 2013/0265780 A1* | 10/2013 | Choksi | F21V 29/74 |
| | | | 362/373 |
| 2014/0006295 A1 | 1/2014 | Zeiler et al. | |
| 2014/0102739 A1 | 4/2014 | Tamm | |
| 2014/0107853 A1 | 4/2014 | Ashinghurst et al. | |
| 2014/0133828 A1* | 5/2014 | Chang | H04N 5/91 |
| | | | 386/235 |
| 2014/0184397 A1 | 7/2014 | Volpert | |
| 2014/0361645 A1* | 12/2014 | Beyerl | H02K 11/33 |
| | | | 310/50 |
| 2015/0061531 A1* | 3/2015 | Kang | H05B 45/00 |
| | | | 315/224 |
| 2015/0111480 A1 | 4/2015 | Vanko et al. | |
| 2015/0256111 A1* | 9/2015 | Forster | H02P 6/14 |
| | | | 318/400.27 |
| 2015/0316913 A1 | 11/2015 | Rickey et al. | |
| 2016/0020443 A1* | 1/2016 | White | H02J 5/00 |
| | | | 318/245 |
| 2016/0063962 A1* | 3/2016 | Park | G09G 3/3666 |
| | | | 345/211 |
| 2016/0171788 A1 | 6/2016 | Wenger et al. | |
| 2016/0181892 A1 | 6/2016 | Purohit et al. | |
| 2016/0311094 A1 | 10/2016 | Mergener et al. | |
| 2016/0325391 A1 | 11/2016 | Stampfl et al. | |
| 2016/0342151 A1 | 11/2016 | Dey, IV et al. | |
| 2016/0344170 A1 | 11/2016 | Tamm | |
| 2016/0356439 A1* | 12/2016 | Inskeep | F21V 21/30 |
| 2016/0365051 A1* | 12/2016 | Jung | G09G 3/3406 |
| 2016/0373457 A1 | 12/2016 | Matson et al. | |
| 2017/0003149 A1 | 1/2017 | Berk et al. | |
| 2017/0008652 A1 | 1/2017 | Figiel et al. | |
| 2017/0057040 A1 | 3/2017 | Rzasa et al. | |
| 2017/0099011 A1 | 4/2017 | Freeman et al. | |
| 2017/0120435 A1* | 5/2017 | Palich | B25F 5/008 |
| 2017/0127501 A1 | 5/2017 | Isaacs et al. | |
| 2017/0173768 A1* | 6/2017 | Dey, IV | B25F 5/00 |
| 2017/0174374 A1 | 6/2017 | Figiel et al. | |
| 2017/0201853 A1 | 7/2017 | Chen et al. | |
| 2017/0358909 A1 | 12/2017 | Ballard et al. | |
| 2018/0005742 A1 | 1/2018 | Newman, Jr. et al. | |
| 2018/0076745 A1* | 3/2018 | Cox | H02P 6/14 |
| 2018/0084646 A1* | 3/2018 | Purohit | H05K 5/0073 |
| 2018/0111259 A1* | 4/2018 | Takeda | B24B 23/022 |
| 2018/0133872 A1 | 5/2018 | Tsai | |
| 2018/0154456 A1 | 6/2018 | Phillips et al. | |
| 2018/0167002 A1* | 6/2018 | Frampton | H02P 9/14 |
| 2018/0181099 A1* | 6/2018 | Steinbach | H02P 27/08 |
| 2018/0204443 A1 | 7/2018 | Nishikawa et al. | |
| 2018/0248507 A1* | 8/2018 | Vanko | H02P 29/50 |
| 2018/0340661 A1* | 11/2018 | Inskeep | F21V 19/02 |
| 2018/0342932 A1* | 11/2018 | Wachter | H02K 5/225 |
| 2019/0003856 A1* | 1/2019 | Kawakami | H02P 6/16 |
| 2019/0009424 A1 | 1/2019 | Steciak, Jr. | |
| 2019/0011892 A1 | 1/2019 | Post et al. | |
| 2019/0044110 A1 | 2/2019 | Sheeks et al. | |
| 2019/0065717 A1* | 2/2019 | Won | G06V 40/1318 |
| 2019/0082240 A1* | 3/2019 | Li | F24F 11/30 |
| 2019/0120687 A1* | 4/2019 | Ding | G01J 1/46 |
| 2019/0157994 A1* | 5/2019 | Prabhala | H02P 6/15 |

(56) References Cited

U.S. PATENT DOCUMENTS

| | | |
|---|---|---|
| 2019/0187668 A1* | 6/2019 | Narasimha ............... H02P 6/15 |
| 2019/0217460 A1 | 7/2019 | Mahalingappa et al. |
| 2019/0222211 A1* | 7/2019 | Yang ................... H03K 17/785 |
| 2019/0335434 A1 | 10/2019 | Wang et al. |
| 2019/0356257 A1 | 11/2019 | Gopalakrishnan et al. |
| 2019/0373072 A1* | 12/2019 | VanBlon ............ H04M 1/72412 |
| 2020/0006021 A1* | 1/2020 | Lewis ..................... B25B 21/02 |
| 2020/0008300 A1* | 1/2020 | Lewis ..................... H02M 7/48 |
| 2020/0043321 A1 | 2/2020 | Huggins et al. |
| 2020/0065263 A1 | 2/2020 | Liff et al. |
| 2020/0147771 A1 | 5/2020 | Mergener et al. |
| 2020/0158609 A1 | 5/2020 | Pratt et al. |
| 2020/0228012 A1 | 7/2020 | Lynch et al. |
| 2020/0252774 A1* | 8/2020 | Brault ..................... H04W 4/80 |
| 2020/0262037 A1 | 8/2020 | Schneider et al. |
| 2020/0294448 A1* | 9/2020 | Heo ..................... G09G 3/3241 |
| 2020/0343840 A1* | 10/2020 | Vanko ................. B25D 11/064 |
| 2020/0376645 A1* | 12/2020 | Davis ................ H04M 1/72415 |
| 2021/0006240 A1 | 1/2021 | Schläfli et al. |
| 2021/0118348 A1* | 4/2021 | Park ..................... G09G 3/3685 |
| 2021/0210407 A1* | 7/2021 | Liu ..................... H01L 23/3107 |
| 2021/0241688 A1* | 8/2021 | Yin ...................... G09G 3/3233 |
| 2022/0059047 A1* | 2/2022 | Wang ................... G09G 3/3677 |
| 2022/0060085 A1 | 2/2022 | Vanko et al. |
| 2022/0265496 A1 | 8/2022 | Xue et al. |
| 2022/0266702 A1 | 8/2022 | Fujimoto et al. |
| 2022/0282706 A1 | 9/2022 | Esbensen et al. |
| 2022/0285986 A1 | 9/2022 | Kim et al. |
| 2022/0287254 A1 | 9/2022 | Barker et al. |
| 2022/0290469 A1 | 9/2022 | Bendel et al. |
| 2022/0295906 A1 | 9/2022 | Park |
| 2022/0296982 A1 | 9/2022 | Kalfa |
| 2022/0297252 A1 | 9/2022 | Riggenmann et al. |
| 2022/0301591 A1 | 9/2022 | Okano et al. |
| 2023/0223833 A1* | 7/2023 | Newman, Jr. ........ H05B 39/044 363/126 |
| 2023/0335053 A1* | 10/2023 | Jiang ..................... G09G 3/3266 |

FOREIGN PATENT DOCUMENTS

| | | |
|---|---|---|
| CN | 208575795 U | 3/2019 |
| DE | 102016210690 A1 | 12/2017 |
| WO | 2008125194 A2 | 10/2008 |
| WO | 2018077667 A1 | 5/2015 |
| WO | 2016154969 A1 | 10/2016 |

OTHER PUBLICATIONS

U.S. Appl. No. 62/691,160 drawings (Year: 2018).*

Silicon Labs, "BGM11S Blue Gecko Bluetooth® SiP Module Data Sheet", Apr. 27, 2017 (95 pages).

ST, "STM32WB Series—Wireless Microcontrollers (MCUs)—STMicroelectronics", Overview, <https://www.st.com/en/microcontrollers-microprocessors/stm32wb-series.html>, accessed May 7, 2019 (3 pages).

* cited by examiner

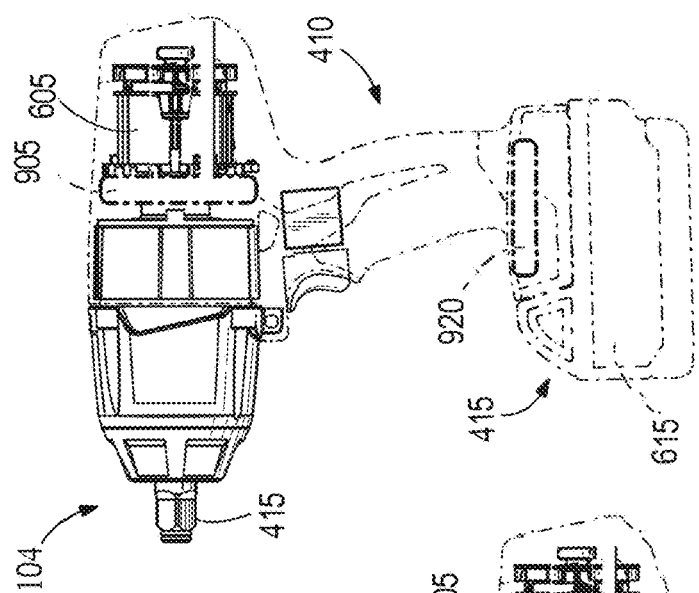
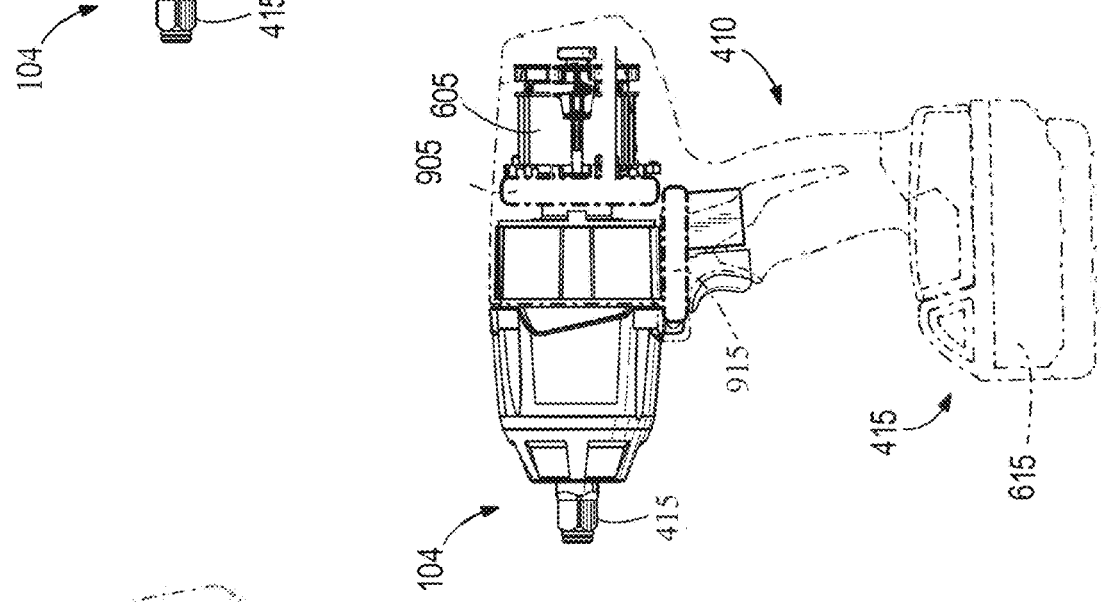
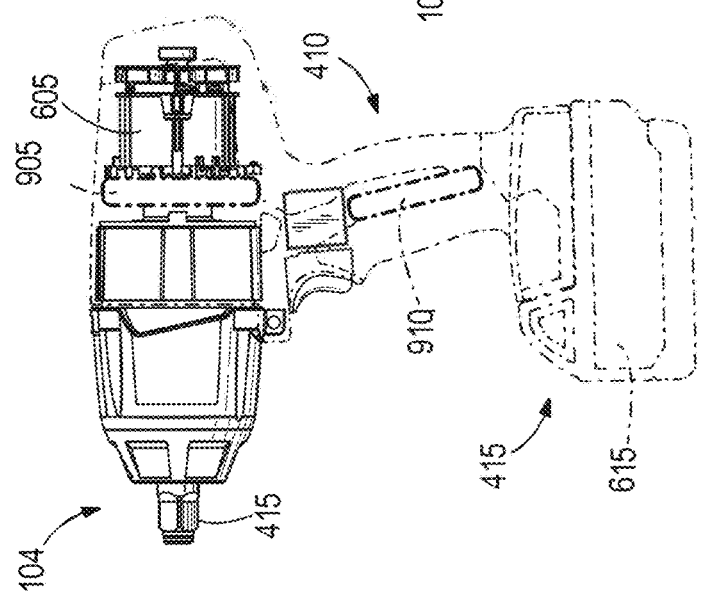

POWER TOOL WITH COMBINED CHIP FOR WIRELESS COMMUNICATIONS AND POWER TOOL CONTROL

RELATED APPLICATIONS

This application is a continuation of U.S. patent application Ser. No. 16/879,245, filed May 20, 2020, now U.S. Pat. No. 11,571,803, which claims the benefit of U.S. Provisional Patent Application No. 62/854,656, filed on May 30, 2019, the entire content of each of which is hereby incorporated by reference.

FIELD

Embodiments described herein relate to power tools that communicate with an external device.

SUMMARY

Power tools described herein include a motor, and an actuator configured to be actuated by a user. The power tools further include a Hall effect sensor configured to monitor motor position information, and a plurality of power switching elements configured to drive the motor. The power tools further include a gate driver coupled to the plurality of power switching elements and configured to control the plurality of power switching elements. The power tools further include a printed circuit board (PCB), and a combined chip located on the PCB and coupled to the actuator, the Hall sensor, and the gate driver. The combined chip includes a memory, an integrated antenna, and an electronic processor. The electronic processor is configured to determine that the actuator has been actuated, and in response to determining that the actuator has been actuated, provide a signal to the gate driver. The gate driver is configured to control the plurality of power switching elements based on the signal. The electronic processor is further configured to receive the motor position information from the Hall effect sensor, and control the signal provided to the gate driver based on the motor position information. The electronic processor is further configured to transmit power tool device information to an external device via the integrated antenna, and receive configuration information from the external device via the integrated antenna. The electronic processor is configured to use the configuration information to determine the signal that is provided to the gate driver.

In some embodiments, the power tool further includes a second chip that is separate from the combined chip, and the second chip may include the gate driver.

Methods described herein for operating a power tool device include determining, with an electronic processor of the power tool device, that an actuator of the power tool device has been actuated by a user. The electronic processor is included in a combined chip that includes a memory and an integrated antenna. The combined chip is located on a first printed circuit board (PCB) and coupled to the actuator. The methods also include providing, with the electronic processor, in response to determining that the actuator has been actuated, a signal to a gate driver. The gate driver is configured to control a plurality of power switching elements configured to drive a motor of the power tool device based on the signal. The methods also include receiving, with the electronic processor, motor position information of the motor from a Hall effect sensor, controlling, with the electronic processor, the signal provided to the gate driver based on the motor position information, wirelessly transmitting, with the electronic processor, power tool device information to an external device via the integrated antenna, wirelessly receiving, with the electronic processor, configuration information from the external device via the integrated antenna, and controlling, with the electronic processor, the signal that is provided to the gate driver based on the configuration information.

Power tool devices described herein include a motor, an actuator configured to be actuated by a user, a plurality of power switching elements configured to drive the motor, a gate driver coupled to the plurality of power switching elements and configured to control the plurality of power switching elements, a first printed circuit board (PCB), an antenna, and a combined chip. The combined chip is located on the first PCB and is coupled to the actuator, the antenna, and the gate driver. The combined chip includes a memory and an electronic processor configured to determine that the actuator has been actuated, and provide, in response to determining that the actuator has been actuated, a signal to the gate driver. The gate driver is configured to control the plurality of power switching elements based on the signal. The combined chip is also configured to determine motor position information, control the signal provided to the gate driver based on the motor position information, wirelessly transmit power tool device information to an external device via the antenna, and wirelessly receive configuration information from the external device via the antenna. The electronic processor is configured to use the configuration information to control the signal that is provided to the gate driver.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

BRIEF DESCRIPTION OF THE DRAWINGS

FIGS. 9A, 9B, and 9C illustrate example locations within the power tool of FIGS. 4 and 6 where printed circuit boards (PCBs) may be positioned.

DETAILED DESCRIPTION

Figure 1:
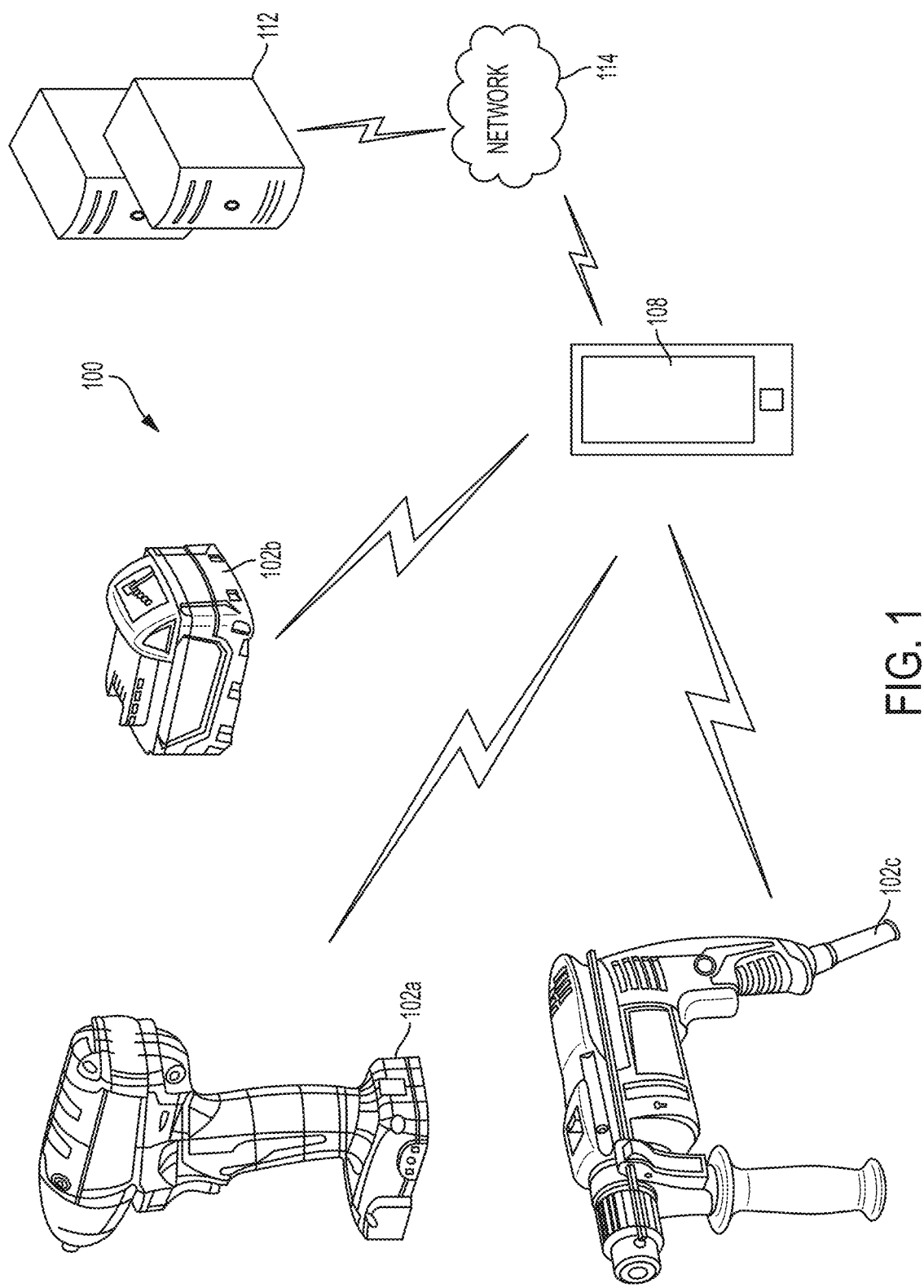
FIG. 1 illustrates a communication system according to one example embodiment.

FIG. 1 illustrates a communication system 100. The communication system 100 includes power tool devices 102 and an external device 108. Each power tool device 102 (e.g., battery powered impact driver 102*a*, power tool battery pack 102*b*, and mains-powered hammer drill 102*c*) and the external device 108 can communicate wirelessly while they are within a communication range of each other. Each power tool device 102 may communicate power tool device information such as power tool status, power tool operation statistics, power tool identification, stored power tool usage information, power tool maintenance data, and the like. Therefore, using the external device 108, a user can access stored power tool usage or power tool maintenance data. With this tool data, a user can determine how the power tool device 102 has been used, whether maintenance is recommended or has been performed in the past, and identify malfunctioning components or other reasons for certain performance issues. The external device 108 can also transmit configuration information to the power tool device 102 for power tool configuration (e.g., motor control), firmware updates, or to send commands (e.g., turn on a work light). The configuration information from the external device 108 may also allow a user to set operational parameters, safety parameters, select tool modes, and the like for the power tool device 102. In some embodiments, the power tool devices 102*a*, 102*b*, and 102*c* may communicate with each other (e.g., peer to peer communication to form a mesh network).

The external device 108 may be, for example, a smart phone (as illustrated), a laptop computer, a tablet computer, a personal digital assistant (PDA), or another electronic device capable of communicating wirelessly with the power tool device 102 and providing a user interface. The external device 108 generates the user interface and allows a user to access and interact with tool information. The external device 108 can receive user inputs to determine operational parameters, enable or disable features, and the like. The user interface of the external device 108 provides an easy-to-use interface for the user to control and customize operation of the power tool.

The external device 108 includes a communication interface that is compatible with a wireless communication interface or module of the power tool device 102. The communication interface of the external device 108 may include a wireless communication controller (e.g., a Bluetooth® module), or a similar component. The external device 108, therefore, grants the user access to data related to the power tool device 102, and provides a user interface such that the user can interact with a processor of the power tool device 102.

In addition, as shown in FIG. 1, the external device 108 can also share the information obtained from the power tool device 102 with a remote server 112 connected by a network 114. The remote server 112 may be used to store the data obtained from the external device 108, provide additional functionality and services to the user, or a combination thereof. In one embodiment, storing the information on the remote server 112 allows a user to access the information from a plurality of different locations. In another embodiment, the remote server 112 may collect information from various users regarding their power tool devices and provide statistics or statistical measures to the user based on information obtained from the different power tools. For example, the remote server 112 may provide statistics regarding the experienced efficiency of the power tool device 102, typical usage of the power tool device 102, and other relevant characteristics and/or measures of the power tool device 102. The network 114 may include various networking elements (routers, hubs, switches, cellular towers, wired connections, wireless connections, etc.) for connecting to, for example, the Internet, a cellular data network, a local network, or a combination thereof. In some embodiments, the power tool device 102 may be configured to communicate directly with the server 112 through an additional wireless communication interface or with the same wireless communication interface that the power tool device 102 uses to communicate with the external device 108.

Figure 2:
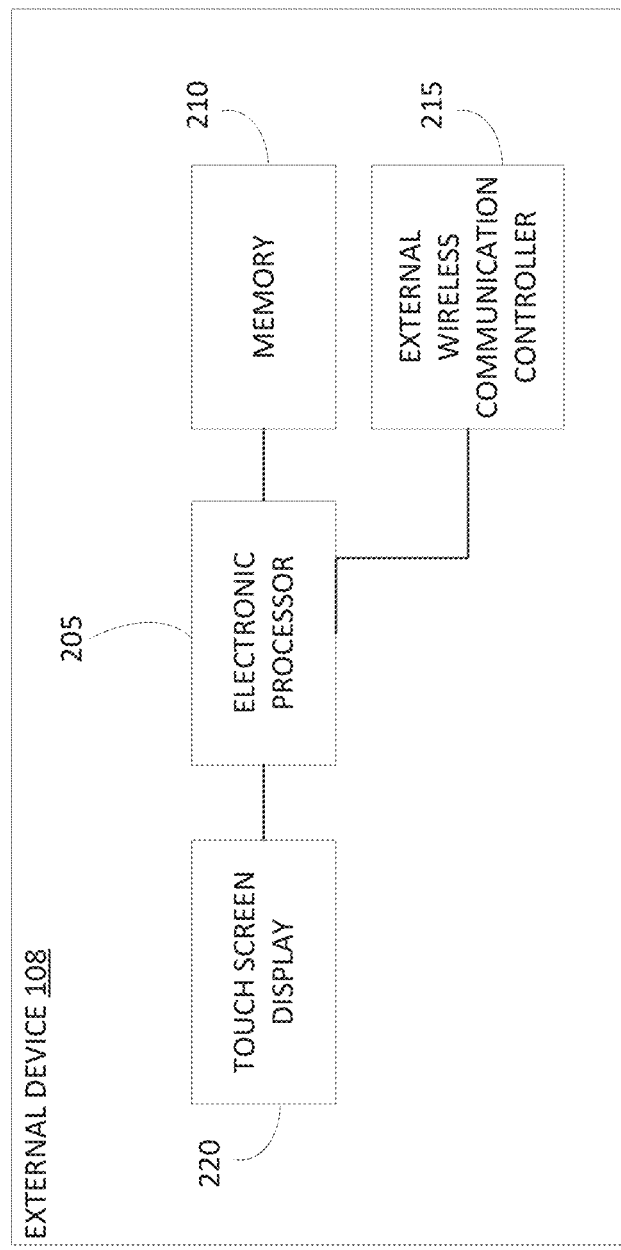
FIG. 2 illustrates a block diagram of an external device of the communication system of FIG. 1 according to one example embodiment.

FIG. 2 illustrates a block diagram of the external device 108 of FIG. 1 according to one example embodiment. As shown in FIG. 2, the external device 108 may include an electronic processor 205 (for example, a microprocessor or another electronic device). The electronic processor 205 may include input and output interfaces (not shown) and be electrically connected to a memory 210, an external wireless communication controller 215, and a touch screen display 220. In some embodiments, the external device 108 may include fewer or additional components in configurations different from that illustrated in FIG. 2. For example, in some embodiments, the external device 108 also includes a camera and a location determining component (for example, a global positioning system receiver).

The memory 210 includes read only memory (ROM), random access memory (RAM), other non-transitory computer-readable media, or a combination thereof. The electronic processor 205 is configured to receive instructions and data from the memory 210 and execute, among other things, the instructions. In particular, the electronic processor 205 executes instructions stored in the memory 210 to perform the functions of the external deice 108 described herein. In some embodiments, the memory 210 stores core application software, tool mode profiles, temporary configuration data, tool interfaces, tool data including received tool identifiers and received tool usage data (e.g., tool operational data).

The touch screen display 220 allows the external device 108 to output visual data to a user and receive user inputs. Although not illustrated, the external device 108 may include further user input devices (e.g., buttons, dials, toggle switches, and a microphone for voice control) and further user outputs (e.g., speakers and tactile feedback elements). Additionally, in some instances, the external device 108 has a display without touch screen input capability and receives user input via other input devices, such as buttons, dials, and toggle switches.

The external device 108 communicates wirelessly with other devices (e.g., the power tool devices 102a, 102b, and 102c and the server 112 of FIG. 1) via the external wireless communication controller 215, e.g., using a Bluetooth® or Wi-Fi® protocol. The external wireless communication controller 215 further communicates with the server 112 over the network 114. The external wireless communication controller 215 includes at least one transceiver to enable wireless communications between the external device 108 and the power tool 104 and/or the server 112 through the network 114. In some instances, the external wireless communication controller 215 includes two separate wireless communication controllers, one for communicating directly with the power tools devices 102 (e.g., using Bluetooth® or Wi-Fi® communications) and one for communicating through the network 114 (e.g., using Wi-Fi® or cellular communications).

In some embodiments, the server 112 includes an electronic processor, a memory, and an external wireless communication controller similar to the like-named components described above with respect to the external device 108. These components may allow the server 112 to communicate with the external device 108 over the network 114. The communication link between the server 112, the network 114, and the external device 108 may include various wired and wireless communication pathways, various network components, and various communication protocols.

Returning to the external device 108, the electronic processor 205 may be configured to generate a graphical user interface (GUI) on the touch screen display 220 enabling the user to interact with the power tool 104 and server 112. In some embodiments, a user may access a repository of software applications (e.g., an "app store" or "app marketplace") using the external device 108 to locate and download core application software, which may be referred to as an "app." In some embodiments, the app is obtained using other techniques, such as downloading from a website using a web browser on the external device 108. As will become apparent from the description below, at least in some embodiments, the app on the external device 108 provides a user with the ability to control, access, and/or interact with a multitude of different tool features for a multitude of different types of tools.

Figure 3B:
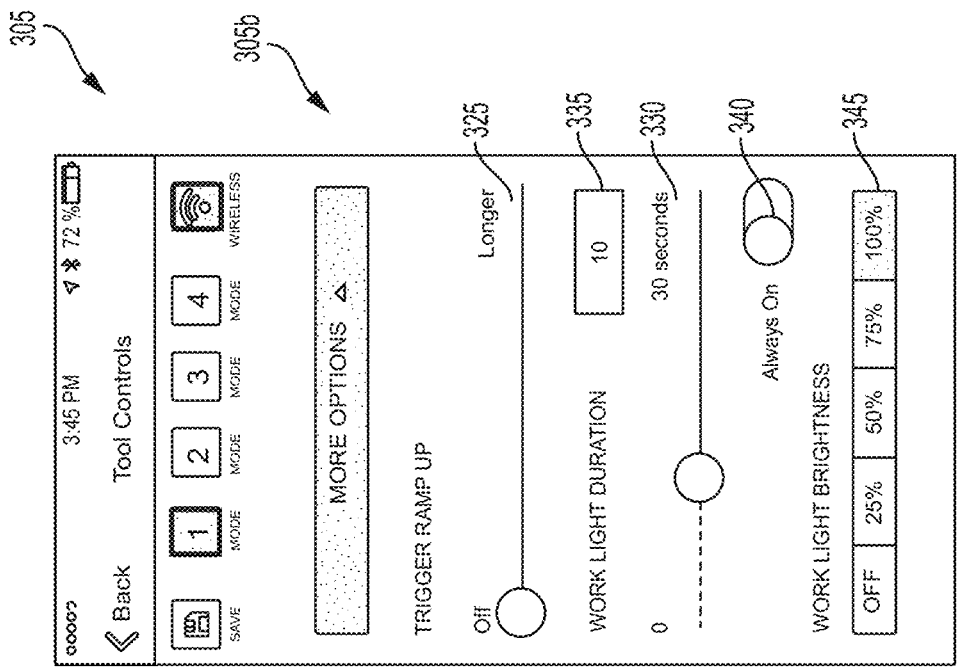
FIGS. 3A and 3B illustrate an example control screen of a graphical user interface (GUI) on a touch screen display of the external device of FIGS. 1 and 2 according to one example embodiment.
Figure 3A:
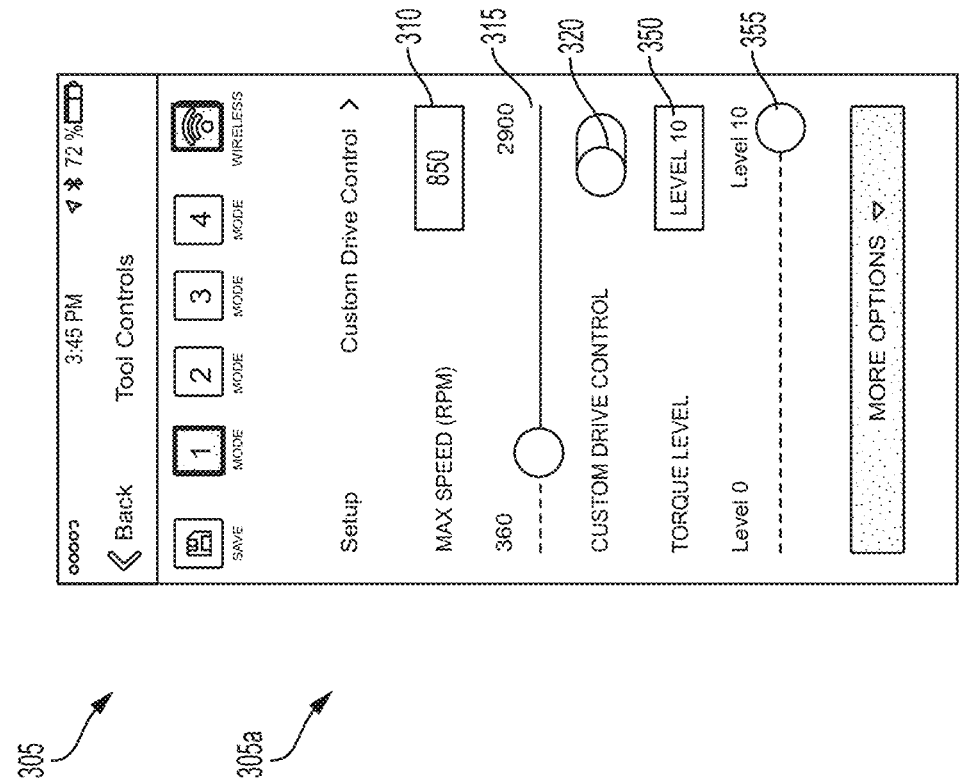

FIGS. 3A and 3B illustrate an example control screen 305 of the GUI on the touch screen display 220 of the external device 108. As shown in FIGS. 3A and 3B, the control screen 305 includes a top portion 305a and a bottom portion 305b. In some embodiments, the information shown on the control screen 305 and the features available to be configured by a user on the control screen 305 depend on a type of the power tool device 102. As mentioned above, the external device 108 may receive user input via the touch screen display 220 and transmit configuration information to the power tool device 102 based on the received user input. In other words, the user is able to configure parameters of the power tool device 102 using the control screen 305. For example, via the control screen 305, the user is able to adjust a maximum speed of a motor of the power tool device 102 via a speed text box 310 or a speed slider 315; enable/disable a custom drive control using a toggle 320; alter a trigger ramp up parameter via slider 325 to adjust how quickly the motor ramps up to a desired speed upon trigger pull; adjust a work light duration with slider 330, work light text box 335, and "always on" toggle 340; and adjust a work light intensity via the work light brightness options 345. Upon enabling the toggle 320, torque level control elements of the custom drive control become active and are no longer greyed-out, such that a user can adjust the torque level using a slider 350 or torque text box 355.

The control screen 305 of FIGS. 3A and 3B is merely an example. In some embodiments, the external device 108 may be configured to display other configurable parameters of the power tool device 102 and send other configuration information to the power tool device 102 in response to receiving user inputs regarding the other configurable parameters. For example, the external device 108 may allow a user to set current or voltage limits and the like. As another example, the external device 108 may display a lockout parameter that allows the user to disable the power tool device 102 (e.g., prevent the motor from operating and/or prevent a work light from turning on) when a user actuates an actuator (i.e., trigger) to operate the motor and/or turn on the work light. In some embodiments, the lockout parameter may be set based on time such that the power tool device 102 locks out (i.e., is disabled) at a future time as set by a user. As another example, the external device 108 may display a geofencing parameter that allows the user to create a geofence such that when the power tool device 102 is moved outside of the geofence, the external device 108 provides a notification indicating that the power tool device 102 is outside of the geofence. As yet another example, the external device 108 may display a tracking feature that allows the user to determine a location at which the power tool device 102 is located.

Additionally, in some embodiments, the control screen 305 may display power tool device information received by the external device 108 from one or more power tool devices 102. For example, the control screen 305 may display usage information and/or status information received from one or more power tool devices 102 by the external device 108 (e.g., an amount of time that the power tool device 102 has been in use, maintenance alerts, battery charge level, geofence boundary violations, and the like). As another example, the control screen 305 may display a list of nearby power tool devices 102 within communication range of the external device 108 and identification data (e.g., a number, name, and/or image) associated with each power tool device 102.

Referring back to FIG. 1, each power tool device 102 may be configured to perform one or more specific tasks (e.g., drilling, cutting, fastening, pressing, lubricant application, sanding, heating, grinding, bending, forming, impacting, polishing, lighting, etc.). For example, an impact wrench is associated with the task of generating a rotational output (e.g., to drive a bit), while a reciprocating saw is associated with the task of generating a reciprocating output motion (e.g., for pushing and pulling a saw blade). As another example, a dedicated work light is associated with the task of lighting a designated area such as a workspace. The task(s) associated with a particular power tool device may also be referred to as the primary function(s) of the power tool device. The particular power tool devices 102 illustrated and described herein (e.g., an impact driver) are merely representative. Other embodiments of the communication system 100 include a variety of types of power tool devices 102 (e.g., a power drill, a hammer drill, a pipe cutter, a sander, a nailer, a grease gun, etc.).

Figure 4:
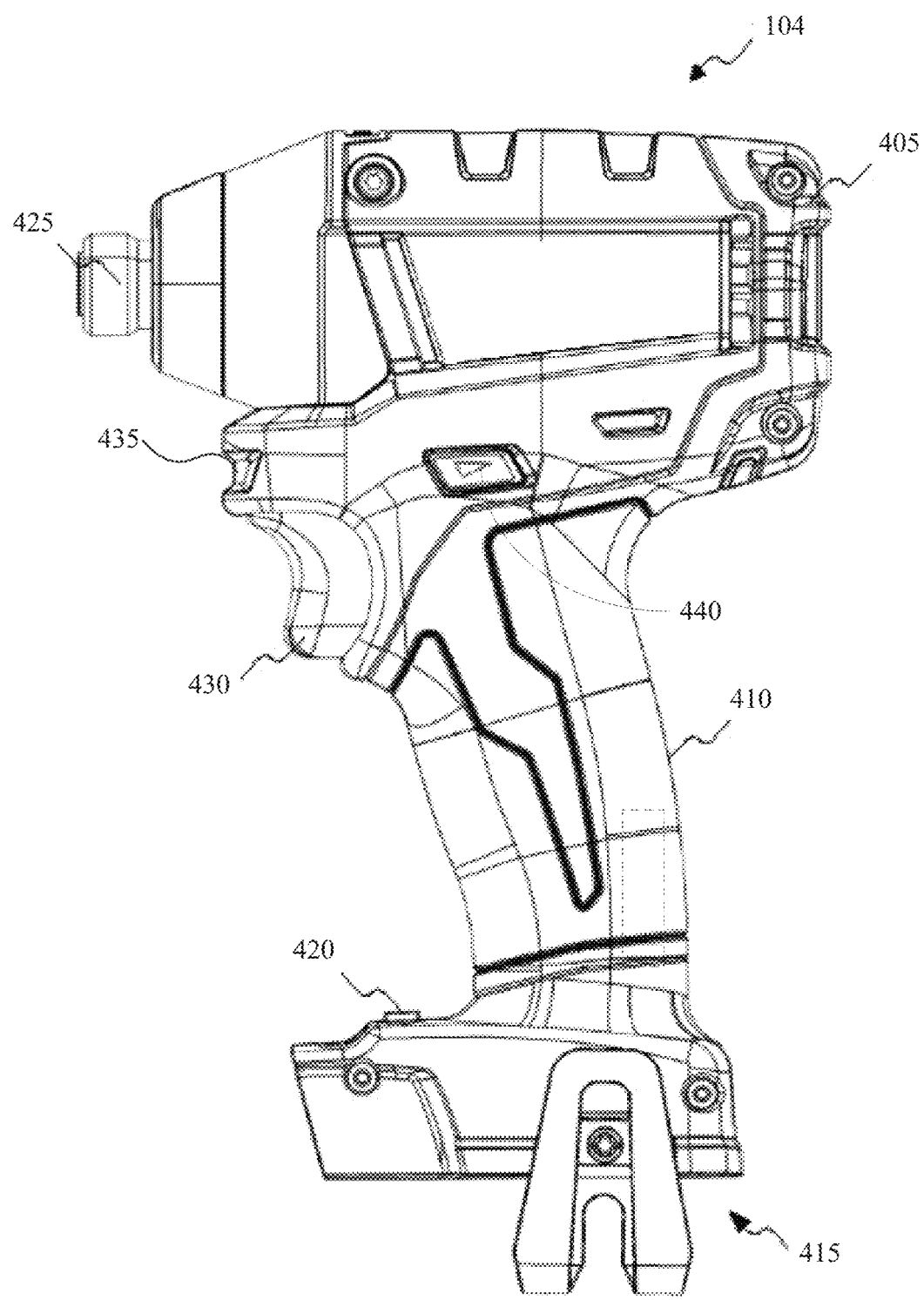
FIG. 4 illustrates a power tool of the communication system of FIG. 1 according to one example embodiment.

As an example of a power tool device 102, FIG. 4 illustrates an impact driver 104 (herein power tool 104). The power tool 104 is representative of various types of power tools that operate within system 100. Accordingly, the description with respect to the power tool 104 in the system 100 is similarly applicable to other types of power tool devices such as other power tools, work lights, battery packs (e.g., power tool device 102b of FIG. 1), and the like. As shown in FIG. 4, the power tool 104 includes an upper main body 405, a handle 410, a battery pack receiving portion 415, mode pad 420, an output drive device or mechanism 425, an actuator 430 (i.e., trigger), a work light 435, and a forward/reverse selector 440. The housing of the power tool 104 (e.g., the main body 405 and the handle 410) are composed of a durable and light-weight plastic material. The drive device 425 may be composed of a metal (e.g., steel). The drive device 425 on the power tool 104 is a socket. However, each power tool 104 may have a different drive device 425 specifically designed for the task (or primary function) associated with the power tool 104. For example, the drive device for a power drill may include a bit driver, while the drive device for a pipe cutter may include a blade. The battery pack receiving portion 415 is configured to receive and couple to the battery pack (e.g., 102b of FIG. 1) that provides power to the power tool 104. The battery pack receiving portion 415 includes a connecting structure to engage a mechanism that secures the battery pack and a terminal block to electrically connect the battery pack to the power tool 104. The mode pad 420 allows a user to select a mode of the power tool 104 and indicates to the user the currently selected mode of the power tool 104. In some embodiments, the modes selectable using the mode pad 420 are received by the power tool 104 from the external device 108 in response to user inputs setting different parameters via the control screen 305 (see FIGS. 3A and 3B).

Figure 5A:
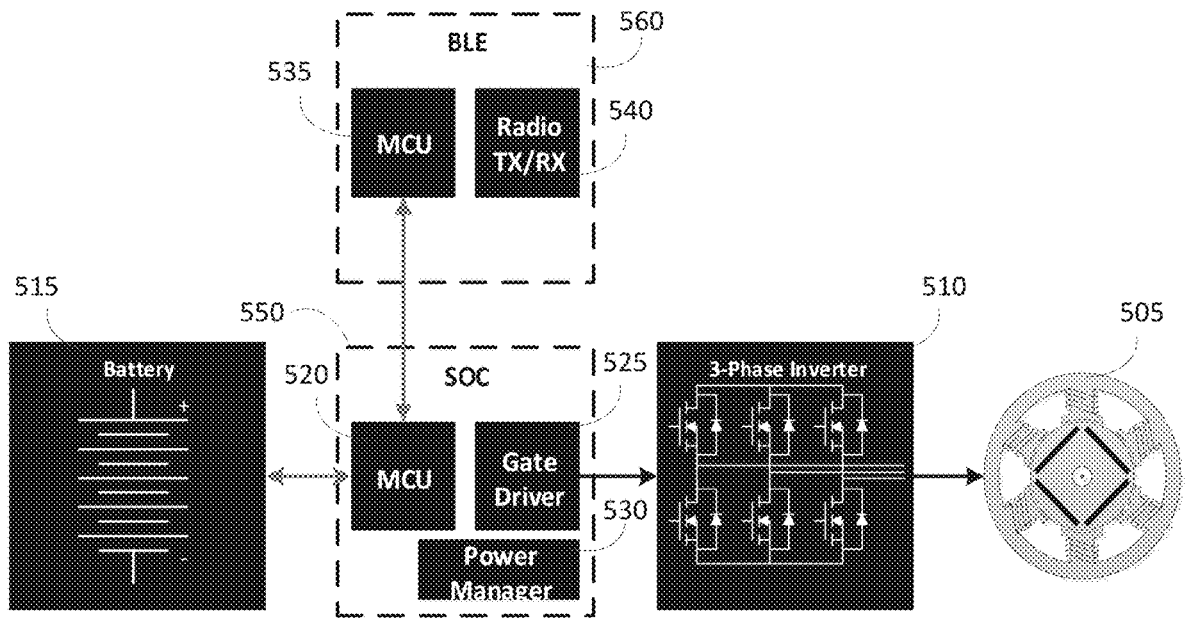
FIGS. 5A and 5B illustrate simplified block diagrams of example prior art power tools.
Figure 5B:
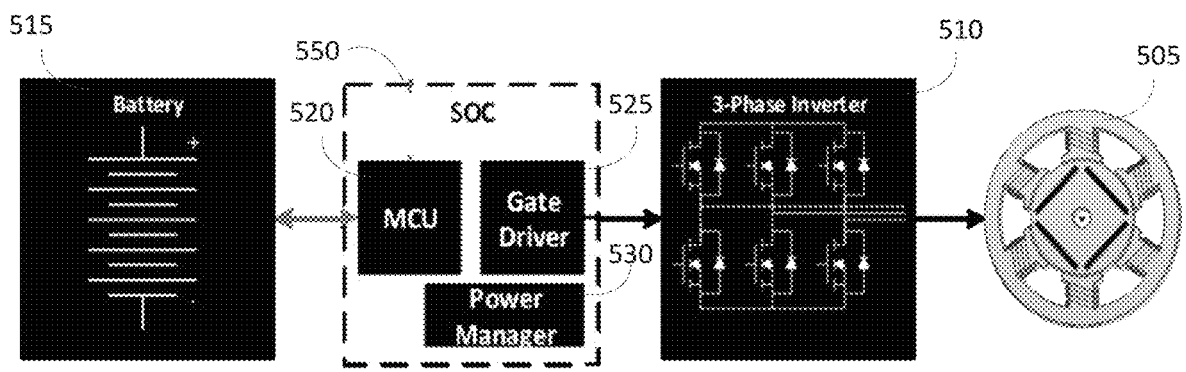

With reference to FIGS. 5A and 5B that illustrate simplified block diagrams of example prior art power tools, some prior art power tools may include a motor 505, a three-phase inverter 510 (including six power switching elements such as field-effect transistors (FETs)), a battery pack 515, a power tool microcontroller 520, a gate driver 525, a power manager 530 for the gate driver 525, a wireless communication microcontroller 535 (i.e., a Bluetooth® low energy (BLE) microcontroller), and a transceiver 540 (i.e., a BLE transceiver). The battery pack 515 may provide power to the power tool microcontroller 520 and the BLE microcontroller 535. The power tool microcontroller 520 may control the gate driver 525 (e.g., by providing a pulse width modulation (PWM) signal based on actuation of the actuator 430). In turn, the gate driver 525 may control the FETs of the three-phase inverter 510 to open/close to allow/disallow current from the battery pack 515 to be provided to coils of a stator of the motor 505 to cause a rotor of the motor 505 to rotate. The power manager 530 may monitor one or more characteristics of the three-phase inverter 510 and/or the motor 505 during operation (e.g., motor current) and may control the gate driver 525 based on the monitored characteristics. For example, the power manager 530 may control the gate driver 525 to prevent the motor 505 from operating in response to an over-current condition being detected. The power tool microcontroller 520 may receive configuration information (e.g., as described previously herein) from the external device 108 via the BLE microcontroller 535 and BLE transceiver 540. Additionally, the power tool microcontroller 520 may transmit power tool device information (e.g., as described previously herein) to the external device 108 via the BLE microcontroller 535 and the BLE transceiver 540.

FIG. 5A illustrates a block diagram of a prior art power tool that includes the above-described components. As shown in FIG. 5A, the power tool microcontroller 520, the gate driver 525, and the power manager 530 of the gate driver 525 are located within a system on chip (SOC) 550 (i.e., a single chip/integrated circuit located on, for example, a printed circuit board (PCB) within the power tool). Also as shown in FIG. 5A, the BLE microcontroller 535 and BLE transceiver 540 are located within a wireless communication chip 560 (i.e., a BLE chip) that is separate from the SOC 550. Separate chips 550 and 560 may be used within the power tool because some power tools may be manufactured without including the BLE chip 560 (e.g., see the block diagram of FIG. 5B that includes the same components of FIG. 5A with the exception of the BLE chip 560).

However, having separate chips 550 and 560 for the power tool microcontroller 520 and the BLE microcontroller 535 and transceiver 540 may provide disadvantages within a power tool. For example, power tools may have limited space within their housing to accommodate components such as the components shown in FIGS. 5A and 5B. When two separate chips 550 and 560 are used, these separate chips take up more space inside the power tool. Furthermore, because the power tool of FIG. 5A includes two separate microcontrollers 520 and 535, these microcontrollers 520 and 535 include interface code to communicate with each other to transfer data. Along similar lines, the power tool includes wires and/or traces that couple the power tool microcontroller 520 to the BLE microcontroller 535 to allow for the microcontrollers 520 and 535 to communicate with each other. These wires and/or traces also consume space inside the power tool and provide sources of failure such as a risk of broken wires, damaged traces, and additional ingress risk.

Figure 6:
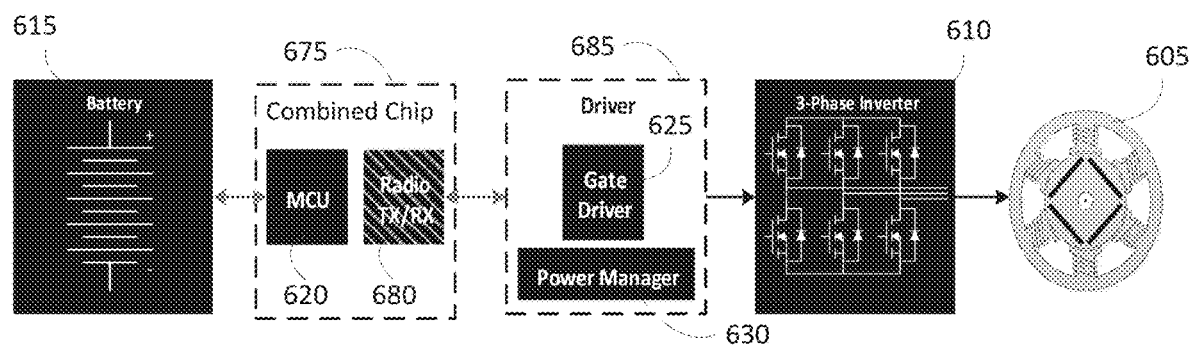
FIG. 6 illustrates a simplified block diagram of the power tool of FIG. 4 according to one example embodiment.

To address and overcome the above-noted disadvantages, FIG. 6 illustrates a block diagram of the power tool 104 that includes a combined chip 675 that includes a microcontroller 620 that controls both power tool operation (e.g., motor control, light control, etc.) and communication between the power tool 104 and the external device 108. The combined chip 675 may also include an integrated transceiver 680 (e.g., an integrated BLE transceiver and antenna) that allows the microcontroller 620 to bidirectionally communicate with the external device 108. In some embodiments, the power tool 104 includes a transceiver and/or antenna that is separate from the combined chip 675 (i.e., that is not integrated into the combined chip 675) and that is coupled to the combined chip 675 to allow the microcontroller 620 to bidirectionally communicate with the external device 108 via the transceiver. As used herein, the term chip refers to a monolithic integrated circuit, which includes electronic circuits integrated onto a single semiconductor material.

As shown in FIG. 6, the power tool 104 may also include similar components as the power tool of FIG. 5A (e.g., a motor 605, a three-phase inverter 610 including six FETs, a battery pack 615, a gate driver 625, and a power manager 630 for the gate driver 625). The chip design shown in FIG. 6 (in particular, the combined chip 675 that includes a single microcontroller 620 that controls both power tool operation (e.g., motor control, light control, etc.) and communication between the power tool 104 and the external device 108) reduces or eliminates the above-noted disadvantages of the design shown in FIG. 5A. For example, the combined chip 675 consumes less space inside the power tool 104 than the two separate chips 550 and 560 of FIG. 5A. Additionally, the single microcontroller 620 may be configured to perform most or all of the functions that were previously performed by the two separate microcontrollers 520 and 535 of FIG. 5A. Thus, the interface between the two separate microcontrollers 520 and 535 of FIG. 5A (e.g., wires and/or traces) may be eliminated as well as any interface code that was previously required to allow for communication between the two separate microcontrollers 520 and 535. Eliminating wires and/or traces may further reduce an amount of space inside the housing of the power tool 104 to, for example, allow the power tool 104 to be more compact and easier to maneuver and/or transport. Eliminating interface code may free up additional space in a memory of the power tool 104 such that additional usage data and/or configuration parameters could be stored, for example. Additionally, eliminating interface code may allow the power tool 104 to operate more efficiently (e.g., engage in bidirectional communication with the external device 108 more quickly) because less processing resources are necessary for such communication to occur. Furthermore, the inclusion of the combined chip 675 in the power tool 104 may simplify a manufacturing process of the power tool 104 by reducing programming steps during manufacturing that may be necessary to configure the two separate microcontrollers 520 and 535 of FIG. 5A to be able to communicate with each other.

In some embodiments, as shown in FIG. 6, the gate driver 625 and the power manager 630 are located within a driver chip 685 that is separate from the combined chip 675, unlike the block diagram of the power tool shown in FIG. 5A. While the driver chip 685 is separate from the combined chip 675 and may include additional wires and/or traces to couple the combined chip 675 with the driver chip 685, the overall advantages described above that are gained with the combined tool control and BLE chip 675 outweigh any minor additional wires and/or traces that couple the combined chip 675 to the driver 685. For example, the advantages provided by the reduction from the two microcontrollers 520 and 535 of FIG. 5A to the single microcontroller 620 of FIG. 6 outweighs the additional wires and/or traces that couple the combined chip 675 to the driver 685.

Figure 7:
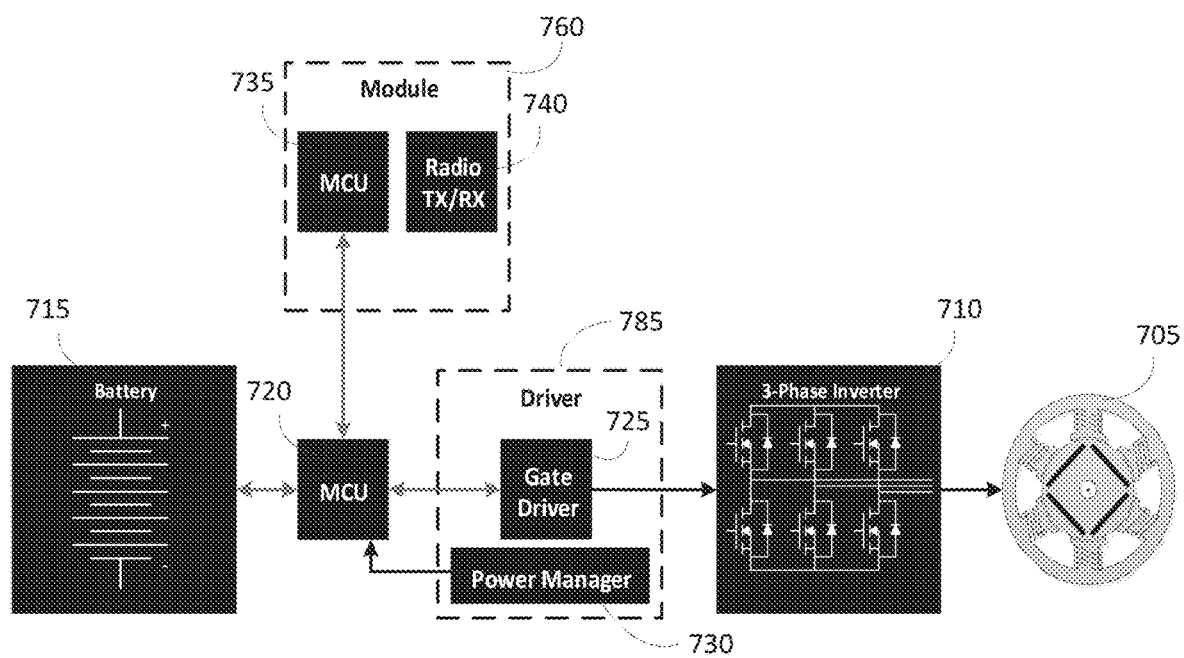
FIG. 7 illustrates a simplified block diagram of the power tool of FIG. 4 according to another example embodiment.

FIG. 7 illustrates another block diagram of the power tool 104 according to an alternative chip design. As shown in the embodiment of FIG. 7, the power tool 104 may include similar components as the power tool of FIG. 6 (e.g., a motor 705, a three-phase inverter 710 including six FETs, a battery pack 715, a power tool microcontroller 720, a gate driver 725, a power manager 730 for the gate driver 725, and a BLE chip 760 that includes a wireless communication microcontroller 735 (i.e., a BLE microcontroller) and a wireless communication transceiver 740 (i.e., a BLE transceiver)). As shown in FIG. 7, the gate driver 725 and the power manager 730 of the gate driver 725 may be located on a first chip (i.e., a driver chip 785), and the power tool microcontroller 720 may be located on a second chip (i.e., a power tool microcontroller chip) separate from the first chip. Additionally, the BLE chip 760 may be a third chip that is separate from each of the driver chip 785 and the power tool microcontroller chip. Because the microcontroller 720 is located on a separate chip from the driver chip 785, different microcontrollers may be used for different power tool devices 102 as opposed to using the same microcontroller 520 that is integrated into the SOC 550 of FIG. 5A for different power tool devices 102.

Figure 8:
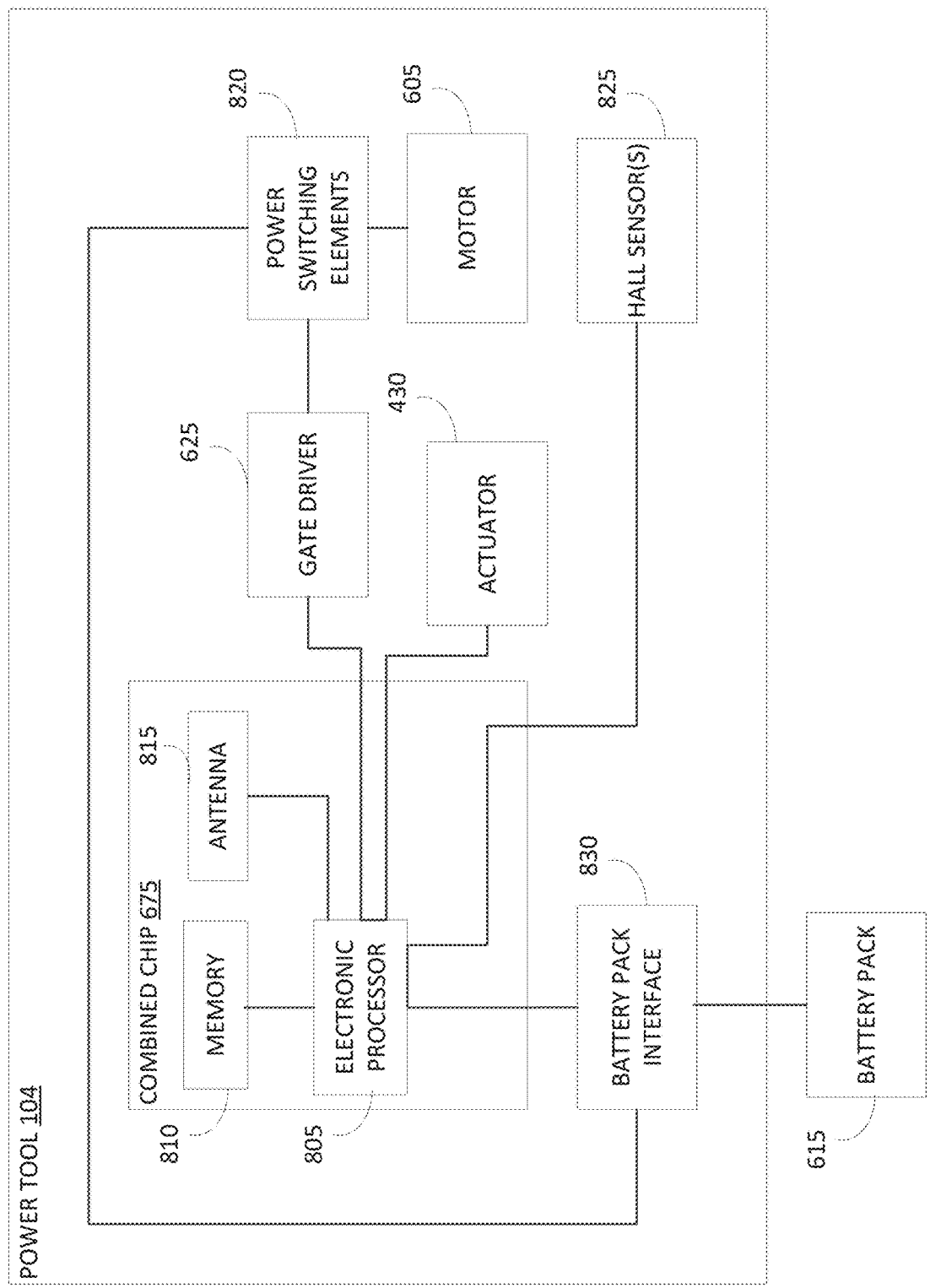
FIG. 8 illustrates a further block diagram of the power tool of FIGS. 4 and 6 according to one example embodiment.

FIG. 8 illustrates a further block diagram of the power tool 104 shown in FIG. 6. As shown in FIG. 8, the power tool 104 includes the motor 605, the battery pack 615, the gate driver 625, and the combined chip 675. In some embodiments, the combined chip 675 may include an electronic processor 805, a memory 810, and an antenna 815. The power tool 104 may further include power switching elements 820, Hall sensor(s) 825, a battery pack interface 830, and the actuator 430. The components of the power tool 104 shown in FIG. 8 will be described in greater detail in the following paragraphs. In some embodiments, the microcontroller 620 of FIG. 6 includes the electronic processor 805 and the memory 810 of FIG. 8. In some embodiments, the transceiver 680 of FIG. 6 includes the electronic processor 805 and the antenna 815 of FIG. 8. In other words, the electronic processor 805, the memory 810 and the antenna 815 may collectively embody the microcontroller 620 and the transceiver 680 of FIG. 6. In some embodiments, the three-phase inverter 610 of FIG. 6 includes the power switching elements 820 of FIG. 8.

In some embodiments, the motor 605 actuates or drives the drive device 425 (see FIG. 4) and allows the drive device 425 to perform a particular task that the power tool 104 is configured to perform. The battery pack 615 (a primary power source) couples to the power tool 104 and provides electrical power to energize the motor 605. The electronic processor 805 monitors a position of the actuator 430 and controls the motor 605 to be energized based on the position of the actuator 430. Generally, when the actuator 430 is depressed, the motor 605 is energized, and when the actuator 430 is released, the motor 605 is de-energized. In the illustrated embodiment, the actuator 430 extends partially down a length of the handle 410 (see FIG. 4); however, in other embodiments the actuator 430 extends down the entire length of the handle 410 or may be positioned elsewhere on the power tool 104. The actuator 430 is moveably coupled to the handle 410 such that the actuator 430 moves with respect to the tool housing. Such movement is detectable by an electronic processor 805 of the power tool 104 (see FIG. 8) through, for example, use of a Hall sensor, potentiometer, or the like. In some instances, a signal based on movement of the actuator 430 is binary and indicates either that the actuator 430 is depressed or released. In other instances, the signal indicates the position of the actuator 430 with more precision. For example, the signal may be an analog signal that varies from 0 to 5 volts depending on the extent that the actuator 430 is depressed. For example, 0 V output indicates that the actuator 430 is released, 1 V output indicates that the actuator 430 is 20% depressed, 2 V output indicates that the actuator 430 is 40% depressed, 3 V output indicates that the actuator 430 is 60% depressed 4 V output indicates that the actuator 430 is 80% depressed, and 5 V indicates that the actuator 430 is 100% depressed. The signal based on movement of the actuator 430 may be analog or digital.

In some embodiments, the battery pack interface 830 is coupled to the combined chip 675 and the battery pack 615. The battery pack interface 830 includes a combination of mechanical (e.g., the battery pack receiving portion 415) and electrical components configured to and operable for interfacing (e.g., mechanically, electrically, and communicatively connecting) the power tool 104 with the battery pack 615. The battery pack interface 830 may include and/or be coupled to a power input unit (not shown). The battery pack interface 830 may transmit the power received from the battery pack 615 to the power input unit. The power input unit may include active and/or passive components (e.g., voltage step-down controllers, voltage converters, rectifiers, filters, etc.) to regulate or control the power received through the battery pack interface 830 and to the combined chip 675 and/or the motor 605.

In some embodiments, the power switching elements 820 enable the electronic processor 805 of the combined chip 675 to control the operation of the motor 605 via the gate driver 625. Generally, when the actuator 430 is depressed, electrical current is supplied from the battery pack interface 830 to the motor 605, via the power switching elements 820. When the actuator 430 is not depressed, electrical current is not supplied from the battery pack interface 830 to the motor 605. In some embodiments, the amount that the actuator 430 is actuated is related to or corresponds to a desired speed of rotation of the motor 605. In other embodiments, the amount that the actuator 430 is actuated is related to or corresponds to a desired torque.

In response to the electronic processor 805 determining that actuator 430 has been actuated, the electronic processor 805 provides a control signal to the gate driver 625 to activate the power switching elements 820 to provide power to the motor 605. The power switching elements 820 control the amount of current available to the motor 605 and thereby control the speed and torque output of the motor 605. The power switching elements 820 may include numerous FETs, bipolar transistors, or other types of electrical switches. For instance, the power switching elements 820 may include a six-FET bridge that receives pulse-width modulated (PWM) signals from the gate driver 625 to drive the motor 605 based on the control signal provided to the gate driver 625 from the electronic processor 805.

In some embodiments, the power tool 104 includes sensors that are coupled to the electronic processor 805 and that communicate to the electronic processor 805 various signals indicative of different parameters of the power tool 104 or the motor 605. The sensors may include Hall sensor(s) 825, current sensor(s) (not shown), among other sensors, such as, for example, one or more voltage sensors, one or more temperature sensors, and one or more torque sensors. Each Hall sensor 825 outputs motor feedback information to the electronic processor 805, such as an indication (e.g., a pulse) when a magnet of the rotor of the motor 605 rotates across the face of that Hall sensor. Based on the motor feedback information from the Hall sensors 825, the electronic processor 805 can determine the position, velocity, and acceleration of the rotor. In response to the motor feedback information and the signals from sensor(s) indicating the position of the actuator 430, the electronic processor 805 transmits control signals to the gate driver 625 to control the power switching elements 820 to drive the motor 605. For instance, by selectively enabling and disabling the power switching elements 820, power received via the battery pack interface 830 is selectively applied to stator coils of the motor 605 to cause rotation of its rotor. The motor feedback information is used by the electronic processor 805 and/or the gate driver 625 to ensure proper timing of control signals to the power switching elements 820 and, in some instances, to provide closed-loop feedback to control the speed of the motor 605 to be at a desired level.

As a more particular example, to drive the motor 605, the electronic processor 805 (via the gate driver 625) enables a first high side FET and first low side FET pair (e.g., by providing a voltage at a gate terminal of the FETs) for a first period of time. In response to determining that the rotor of the motor 605 has rotated based on a pulse from the Hall sensors 825, the electronic processor 805 (via the gate driver 625) disables the first FET pair, and enables a second high side FET and a second low side FET. In response to determining that the rotor of the motor 605 has rotated based on pulse(s) from the Hall sensors 825, the electronic processor 805 (via the gate driver 625) disables the second FET pair, and enables a third high side FET and a third low side FET. This sequence of cyclically enabling pairs of high side and low side FETs repeats to drive the motor 605. Further, in some embodiments, one or both of the control signals to each FET pair includes pulse width modulated (PWM) signals having a duty cycle that is set in proportion to the amount of trigger pull to thereby control the speed or torque of the motor 605.

As shown in FIG. 8, the combined chip 675, and in particular the electronic processor 805, is electrically and/or communicatively connected to a variety of components of the power tool 104. In some embodiments, the combined chip 675 includes a plurality of electrical and electronic components that provide power, operational control, and protection to the components within the combined chip 675 and/or power tool 104. For example, the combined chip 675 includes, among other things, the electronic processor 805 (e.g., a microprocessor, a microcontroller, or another suitable programmable device), the memory 810, and input/output units (e.g., input/output pins). The electronic processor 805 may include, among other things, a control unit, an arithmetic logic unit ("ALU"), and a plurality of registers. In some embodiments, the combined chip 675 is implemented partially or entirely on a semiconductor (e.g., a field-programmable gate array ["FPGA"] semiconductor) chip, such as a chip developed through a register transfer level ("RTL") design process. Although FIG. 8 shows the combined chip 675 as including a single electronic processor 805, in some embodiments, the combined chip 675 includes additional electronic processors. For example, the combined chip 675 may include a first electronic processor configured to control operation of the motor 605 as described above and a second electronic processor configured to manage wireless communication to and from the power tool 104 via the antenna 815.

The memory 810 includes, for example, a program storage area and a data storage area. The memory 810 may include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor 805 is connected to the memory 810 and executes software instructions that are capable of being stored in a RAM of the memory 810 (e.g., during execution), a ROM of the memory 810 (e.g., on a generally permanent basis), or another non-transitory computer readable medium such as another memory or a disc. Software included in the implementation of the power tool 104 can be stored in the memory 810. The software includes, for example, firmware, one or more applications, program data, filters, rules, one or more program modules, and other executable instructions. The electronic processor 805 is configured to retrieve from the memory 810 and execute, among other things, instructions related to the control processes and methods described herein. The electronic processor 805 is also configured to store power tool device information on the memory 810 including operational data, information identifying the type of tool, a unique identifier for the particular tool, and other information relevant to operating or maintaining the power tool 104. The power tool device information, such as current levels, motor speed, motor acceleration, motor direction, number of impacts, may be captured or inferred from data output by the sensors included in the power tool 104. Such power tool device information may then be accessed by a user with the external device 108. In other constructions, the combined chip 675 includes additional, fewer, or different components. For example, the gate driver 625 or functionality implemented by the gate driver 625 may be included and/or implemented within the combined chip 675 rather than being included in a second chip that is separate from the combined chip 675 as shown in FIG. 6.

In some embodiments, the combined chip 675, and in particular the electronic processor 805, also acts as a wireless communication controller. As shown in FIG. 8, the combined chip 675 includes an integrated antenna 815. The combined chip 675 may also include a radio transceiver coupled to the antenna 815 and to the electronic processor 805 to allow the electronic processor 805 to bidirectionally communicate with the external device 108 via the antenna 815. In some embodiments, the antenna 815 may not be integrated with the combined chip 675 and may be located elsewhere in the power tool 104. However, in such embodiments, the combined chip 675 may still act as the wireless communication controller such that a separate wireless communication chip is not used within the power tool 104 as explained previously herein. For example, the electronic processor 805 may nevertheless act as a wireless transceiver to bidirectionally communicate with the external device 108 via an antenna that is not integrated into the combined chip 675.

In some embodiments, the memory 810 can store instructions to be implemented by the electronic processor 805 and/or may store data related to communications between the power tool 104 and the external device 108 or the like. The electronic processor 805 controls wireless communications between the power tool 104 and the external device 108. For example, the electronic processor 805 buffers incoming and/or outgoing data and determines the communication protocol and/or settings to use in wireless communications.

In the illustrated embodiment, the electronic processor 805 may include a Bluetooth® controller. The Bluetooth® controller communicates with the external device 108 employing the Bluetooth® protocol. Therefore, in the illustrated embodiment, the external device 108 and the power tool 104 are within a communication range (i.e., in proximity) of each other while they exchange data. In other embodiments, the electronic processor 805 communicates using other protocols (e.g., Wi-Fi, cellular protocols, a proprietary protocol, etc.) over a different type of wireless network. For example, the electronic processor 805 may be configured to communicate via Wi-Fi through a wide area network such as the Internet or a local area network, or to communicate through a piconet (e.g., using infrared or NFC communications). The communication between the power tool 104 and the external device 108 may be encrypted to protect the data exchanged between the power tool 104 and the external device/network 108 from third parties.

The electronic processor 805 may periodically broadcast an advertisement message that may be received by an external device 108 in communication range of the power tool 104. The advertisement message may include identification information regarding the tool identity, remaining capacity of a battery pack 615 attached to the power tool 104, and other limited amount of power tool device information. The advertisement message may also identify the product as being from a particular manufacturer or brand.

When the power tool 104 and the external device 108 are within communication range of each other, the electronic processor 805 may establish a communication link (e.g., pair) with the external device 108 to allow the external device 108 to obtain and export power tool device information such as tool usage data, maintenance data, mode information, drive device information, and the like from the power tool 104. The exported information can be used by tool users or owners to log data related to a particular power tool 104 or to specific job activities. The exported and logged data can indicate when work was accomplished and that work was accomplished to specification. The logged data can also provide a chronological record of work that was performed, track duration of tool usage, and the like. While paired with the external device 108, the electronic processor 805 may also import (i.e., receive) information from the external device 108 into the power tool 104 such as, for example, configuration information such as operation thresholds, maintenance thresholds, mode configurations, programming for the power tool 104, software updates, and the like.

In some embodiments, the power tool 104 may include fewer or additional components in configurations different from that illustrated in FIG. 8. For example, in some embodiments, the power tool 104 includes indicators (e.g., light-emitting diodes (LEDs) and/or a display screen) that are coupled to the electronic processor 805 and receive control signals from the electronic processor 805 to turn on and off or otherwise convey information based on different states of the power tool 104. For example, the indicators may be configured to indicate measured electrical characteristics of the power tool 104, the status of the power tool 104, the mode of the power tool 104, and the like. The indicators may also include elements to convey information to a user through audible or tactile outputs. As another example, the power tool 104 may include a real-time clock (RTC) configured to increment and keep time independently of the other power tool components. Having the RTC as an independently powered clock enables time stamping of operational data (stored in memory 810 for later export) and a security feature whereby a lockout time is set by a user and the tool is locked-out when the time of the RTC exceeds the set lockout time. As another example, the power tool 104 may include a location component (for example, a global positioning system receiver) used for tracking a location of the power tool 104. As another example, the power tool 104 may not include Hall sensor(s) 825 to monitor rotational position information of the motor 605. Rather, the power tool 104 may implement a sensor-less design to monitor rotational position of the motor 605, for example, by monitoring back electromotive force (EMF) of the motor 605.

In some embodiments, the power tool 104 includes one or more printed circuit boards (PCBs) that include one or more of the electrical components shown in FIG. 8. FIGS. 9A-C illustrate example locations within the power tool 104 where the PCBs may be positioned. As shown in FIGS. 9A-C, in some embodiments, the power tool 104 includes a Hall sensor PCB located at position 905 in front of the motor 605. In other embodiments, the Hall sensor PCB may be located behind the motor 605 or the Hall sensor PCB may not be present within the power tool 104. FIGS. 9A, 9B, and 9C illustrate board locations 910, 915, and 920, respectively, which are locations at which a control PCB 1005 (shown in FIG. 10) may be located within the power tool 104. For example, as shown in FIG. 9A, in some embodiments, a control PCB (e.g., the control PCB 1005 of FIG. 10) that includes the combined chip 675 is located in the handle 410 of the power tool 104 at the location 910. As shown in FIG. 9B, in some embodiments, a control PCB (e.g., the control PCB 1005) that includes the combined chip 675 is located above the actuator 430 and the handle 410, but below the motor 605 and drive device 425, at the location 915. As shown in FIG. 9C, in some embodiments, a control PCB (e.g., the control PCB 1005) that includes the combined chip 675 is located below the handle 410 and above the battery pack receiving portion 415, at the location 920. In some embodiments, the control PCB at the locations 910, 915, and 920 (e.g., the control PCB 1005) also includes at least one of the gate driver 625 and the power switching elements 820, in addition to the combined chip 675. In some embodiments, the components explained above as being included on the control PCB 1005 may instead be located on the Hall sensor PCB.

Figure 10:
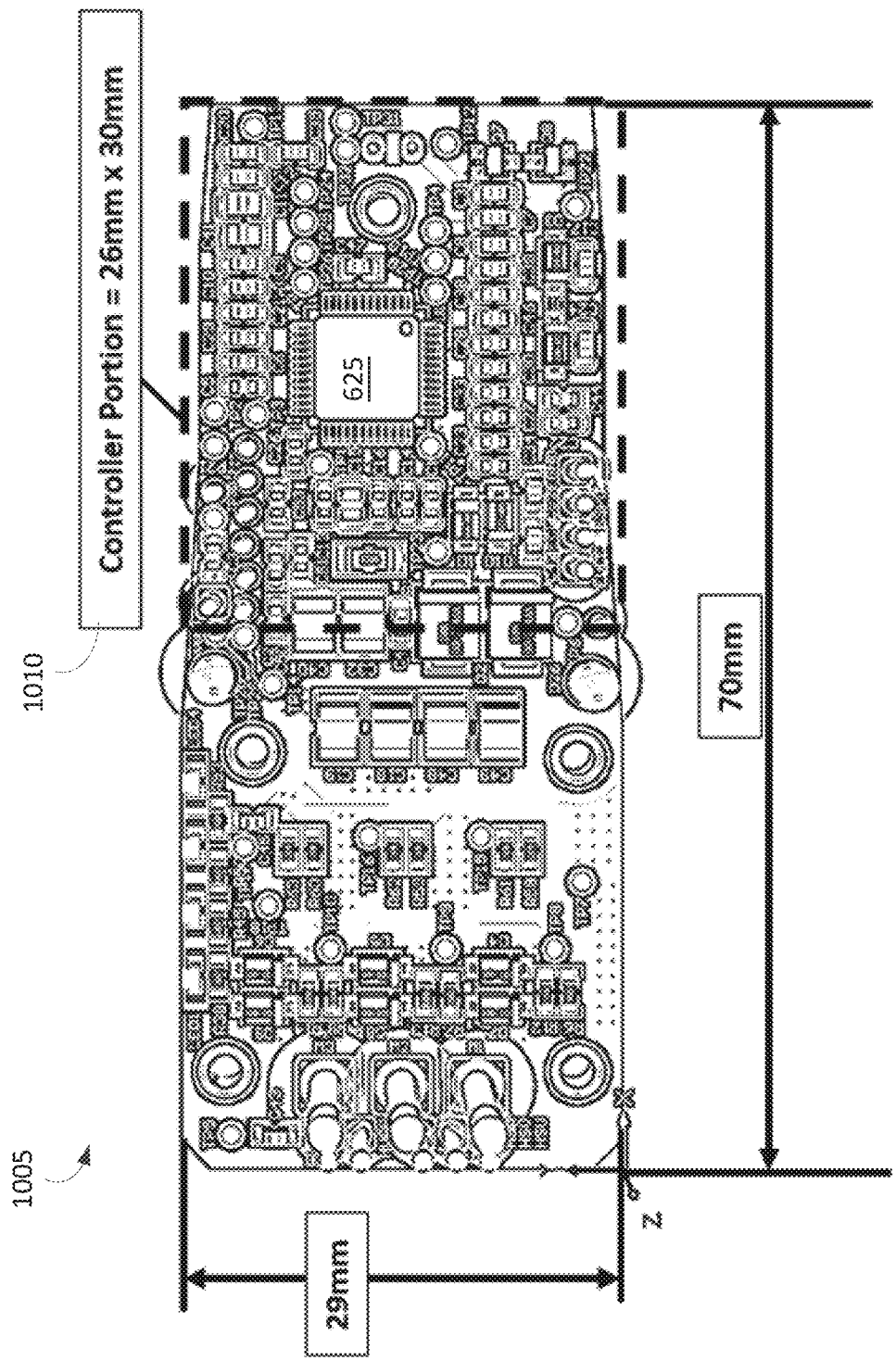
FIG. 10 illustrates a control PCB of the power tool of FIGS. 4 and 6 according to one example embodiment.

FIG. 10 illustrates the control PCB 1005 according to one example embodiment. In some embodiments, the control PCB 1005 is approximately 70 millimeters long and 29 millimeters wide. In some embodiments, a controller portion 1010 of the control PCB 1005 includes the combined chip 675 and is approximately 30 millimeters long and 26 millimeters wide. As shown in FIG. 10, in some embodiments, the controller portion 1010 may include approximately half of the control PCB 1005 or may include less than half of the control PCB 1005. As mentioned above, in some embodiments, the control PCB 1005 includes the gate driver 625 and the power switching elements 820 in addition to the combined chip 675. The term "approximately" is defined as being close to as understood by one of ordinary skill in the art, and in one non-limiting embodiment the term is defined to be within 10%, in another embodiment within 5%, in another embodiment within 1% and in another embodiment within 0.5%. The size, shape, and location of components on the control PCB 1005 shown in FIG. 10 is an example. In some embodiments, the size, shape, and location of components on the control PCB 1005 may be different.

Figure 11:
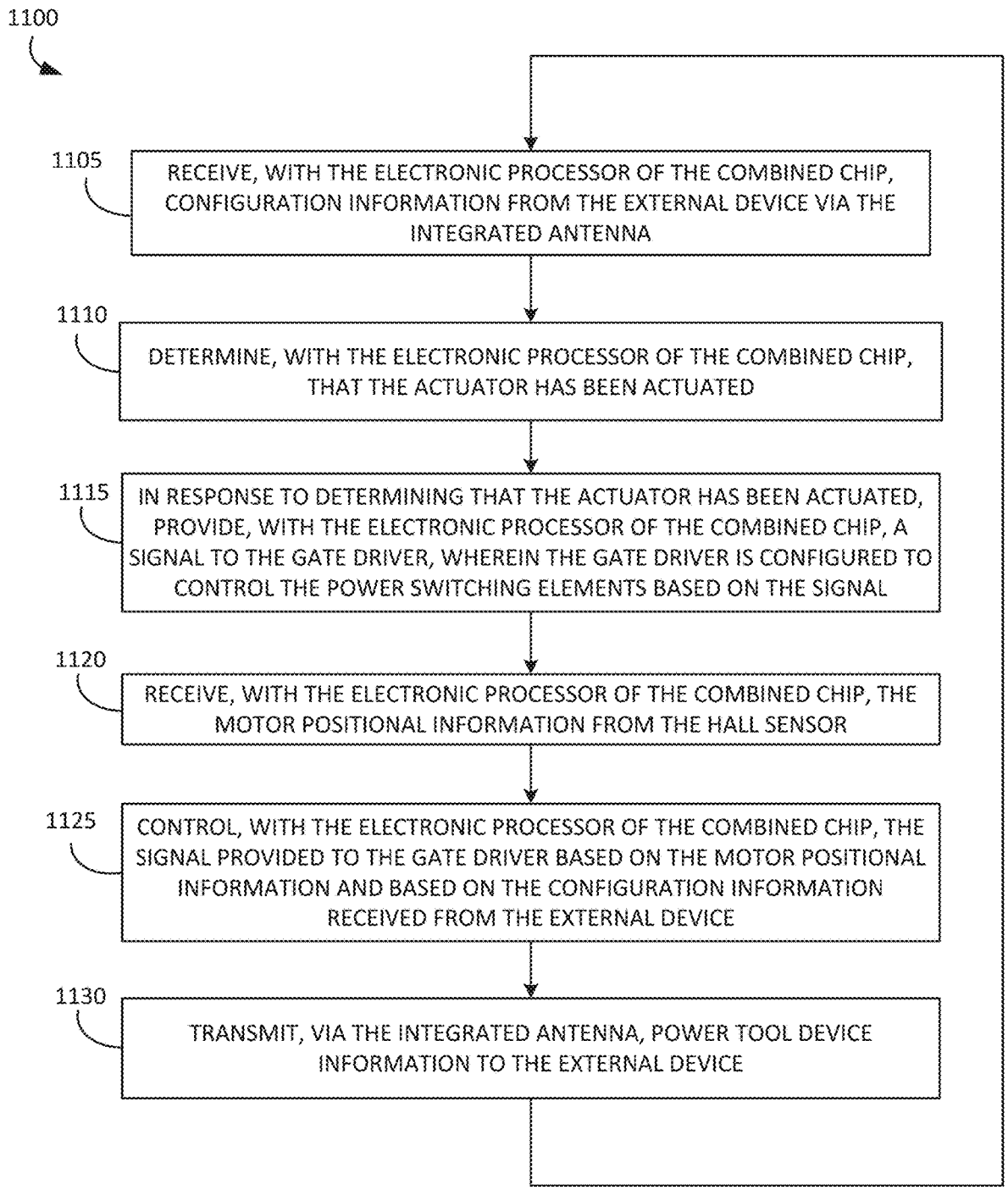
FIG. 11 illustrates a flowchart of a method performed by an electronic processor of a combined chip of the power tool of FIGS. 4, 6, and 8 according to one example embodiment.

FIG. 11 illustrates a flowchart of a method 1100 performed by the electronic processor 805 of the combined chip 675 according to one example embodiment. While a particular order of processing steps, message receptions, and/or message transmissions is indicated in FIG. 11 as an example, timing and ordering of such steps, receptions, and transmissions may vary where appropriate without negating the purpose and advantages of the examples set forth in detail throughout the remainder of this disclosure.

At block 1105, the electronic processor 805 of the combined chip 675 receives configuration information from the external device 108 via the integrated antenna 815. At block 1110, the electronic processor 805 determines that the actuator 430 has been actuated. At block 1115, in response to determining that the actuator 430 has been actuated, the electronic processor 805 provides a signal to the gate driver 625, and the gate driver 625 is configured to control the power switching elements 820 based on the signal. In some embodiments, the signal is generated at least in part based on the configuration information received (e.g., which may include motor control parameters specified by a user via a control screen on the external device 108). At block 1120, the electronic processor 805 receives the motor positional information from the Hall sensor(s) 825. At block 1125, the electronic processor 805 controls the signal provided to the gate driver 625 based on the motor positional information and based on the configuration information received from the external device 108. At block 1130, the electronic processor 805 transmits power tool device information to an external device 108 via the integrated antenna 815. As indicated in FIG. 11, the electronic processor 805 proceeds back to block 1105 after completing block 1130 to repeat one or more blocks of the method 1100 (e.g., to continue operating the motor 605 in accordance with the actuation of the actuator 430 and the received motor positional information). Example techniques to implement each of the blocks in the method 1100 are provided in further detail in the preceding discussion with respect to FIGS. 1-8.

As explained previously herein, the above description of the combined chip 675 may be implemented in other power tool devices such as work lights, battery packs, and the like.

Thus, embodiments described herein provide, among other things, a power tool that communicates with an external device for configuring the power tool and obtaining data from the power tool.

What is claimed is:
1. A power tool device comprising:
an actuator configured to be actuated by a user;
a powered element;
a power switching element configured to control whether power is provided to the powered element;
a gate driver coupled to the power switching element and configured to control the power switching element;
a printed circuit board (PCB);
a driver chip including the gate driver and a power manager for the gate driver, wherein the power manager is configured to:

monitor a characteristic of the powered element, the power switching element, or both the powered element and the power switching element, and control the gate driver based on the characteristic that is monitored;

a combined chip located on the PCB and coupled to the actuator and the gate driver, wherein the combined chip includes a memory, an integrated antenna, and an electronic processor, the electronic processor configured to:

determine that the actuator has been actuated, provide, in response to determining that the actuator has been actuated, a signal to the gate driver, wherein the gate driver is configured to control the power switching element based on the signal, wirelessly transmit power tool device information to an external device via the integrated antenna, and wirelessly receive configuration information from the external device via the integrated antenna, wherein the electronic processor is configured to use the configuration information to control the signal that is provided to the gate driver.

2. The power tool device of claim 1, wherein the powered element includes a work light, and wherein the electronic processor is configured to control the signal provided to the gate driver to control a work light duration, a work light intensity, or both the work light duration and the work light intensity.

3. The power tool device of claim 1, wherein the power tool device includes a dedicated work light, and wherein a primary function of the power tool device includes lighting an area.

4. The power tool device of claim 1, wherein the powered element includes a motor, and further comprising a Hall effect sensor configured to monitor motor position information of the motor;

wherein the combined chip is coupled to the Hall effect sensor; and wherein the electronic processor is configured to receive the motor position information from the Hall effect sensor, and control the signal provided to the gate driver based on the motor position information.

5. The power tool device of claim 1, wherein the PCB is located below the powered element and above the actuator.

6. The power tool device of claim 1, wherein the power switching element is located on the PCB.

7. The power tool device of claim 1, wherein the power tool device information includes at least one of the group consisting of usage data, maintenance data, mode information, and combinations thereof; and wherein the configuration information includes at least one of the group consisting of a motor speed parameter, a motor torque parameter, a work light parameter, and combinations thereof.

8. A method of operating a power tool device, the method comprising:

determining, with an electronic processor of the power tool device, that an actuator of the power tool device has been actuated by a user, wherein the electronic processor is included in a combined chip that includes a memory and an integrated antenna, the combined chip being located on a printed circuit board (PCB) and coupled to the actuator;

providing, with the electronic processor, in response to determining that the actuator has been actuated, a signal to a gate driver, the gate driver being configured to control a power switching element configured to control whether power is provided to a powered element of the power tool device based on the signal, wherein the gate driver is included in a driver chip that includes a power manager for the gate driver, the power manager configured to:

monitor a characteristic of the powered element, the power switching element, or both the powered element and the power switching element, and control the gate driver based on the characteristic that is monitored;

wirelessly transmitting, with the electronic processor, power tool device information to an external device via the integrated antenna;

wirelessly receiving, with the electronic processor, configuration information from the external device via the integrated antenna; and controlling, with the electronic processor, the signal that is provided to the gate driver based on the configuration information.

9. The method of claim 8, wherein the powered element includes a work light, and wherein providing the signal to the gate driver includes providing, with the electronic processor, the signal to the gate driver to control a work light duration, a work light intensity, or both the work light duration and the work light intensity.

10. The method of claim 8, wherein the power tool device includes a dedicated work light, and wherein a primary function of the power tool device includes lighting an area.

11. The method of claim 8, wherein the powered element includes a motor, and further comprising:

receiving, with the electronic processor, motor position information of the motor from a Hall effect sensor coupled to the combined chip; and controlling, with the electronic processor, the signal provided to the gate driver based on the motor position information.

12. The method of claim 8, wherein the first PCB is located below the powered element and above the actuator.

13. The method of claim 8, wherein the power switching element is located on the PCB.

14. The method of claim 8, wherein the power tool device information includes at least one of the group consisting of usage data, maintenance data, mode information, and combinations thereof; and wherein the configuration information includes at least one of the group consisting of a motor speed parameter, a motor torque parameter, a work light parameter, and combinations thereof.

15. A power tool device comprising:

an actuator configured to be actuated by a user;

a powered element;

a power switching element configured to control whether power is provided to the powered element;

a gate driver coupled to the power switching element and configured to control the power switching element;

a printed circuit board (PCB);

an antenna;

a driver chip including the gate driver and a power manager for the gate driver, wherein the power manager is configured to:

monitor a characteristic of the powered element, the power switching element, or both the powered element and the power switching element, and control the gate driver based on the characteristic that is monitored;

a combined chip located on the first PCB and coupled to the actuator, the gate driver, and the antenna, wherein the combined chip includes a memory and an electronic processor, the electronic processor configured to:
determine that the actuator has been actuated,
provide, in response to determining that the actuator has been actuated, a signal to the gate driver, wherein the gate driver is configured to control the power switching element based on the signal,
wirelessly transmit power tool device information to an external device via the antenna, and
wirelessly receive configuration information from the external device via the antenna, wherein the electronic processor is configured to use the configuration information to control the signal that is provided to the gate driver.

16. The power tool device of claim 15, wherein the powered element includes a work light, and wherein the electronic processor is configured to control the signal provided to the gate driver to control a work light duration, a work light intensity, or both the work light duration and the work light intensity.

17. The power tool device of claim 15, wherein the power tool device includes a dedicated work light, and wherein a primary function of the power tool device includes lighting an area.

18. The power tool device of claim 15, wherein the powered element includes a motor, and further comprising a Hall effect sensor configured to monitor motor position information of the motor;
wherein the combined chip is coupled to the Hall effect sensor; and
wherein the electronic processor is configured to receive the motor position information from the Hall effect sensor, and control the signal provided to the gate driver based on the motor position information.

19. The power tool device of claim 15, wherein the PCB is located below the powered element and above the actuator.

20. The power tool device of claim 15, wherein the power tool device information includes at least one of the group consisting of usage data, maintenance data, mode information, and combinations thereof; and
wherein the configuration information includes at least one of the group consisting of a motor speed parameter, a motor torque parameter, a work light parameter, and combinations thereof.

* * * * *